(No Model.)
W. ASPDEN.
SACK USED IN PICKING CITRUS FRUITS.
No. 558,022. Patented Apr. 14, 1896.
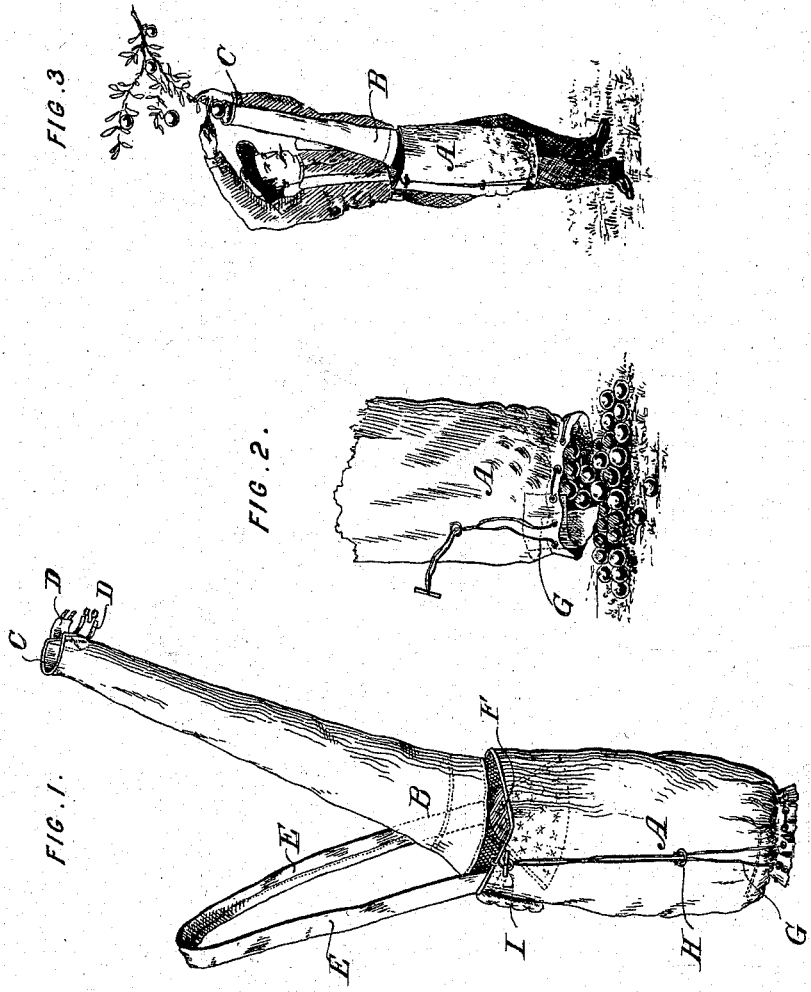
WITNESSES
H. B. Lewis
Francis J. Thomas
INVENTOR
Walter Aspden
BY St. John Day
ATTORNEY.

UNITED STATES PATENT OFFICE.

WALTER ASPDEN, OF RIVERSIDE, CALIFORNIA.

SACK USED IN PICKING CITRUS FRUITS.

SPECIFICATION forming part of Letters Patent No. 558,022, dated April 14, 1896.

Application filed August 31, 1894. Serial No. 521,791. (No model.)

*To all whom it may concern:*

Be it known that I, WALTER ASPDEN, a subject of the Queen of Great Britain, (but who has applied to become a citizen of the United States,) and a resident of Riverside, in the county of Riverside and State of California, have invented certain new and useful Improvements in Sacks or Similar Receptacles Used in Picking Citrus and other Fruits, of which the following is a full, clear, and exact description or specification, reference being had to the accompanying sheet of drawings, and to the letters marked thereon.

My invention, which relates to certain improvements in sacks or similar receptacles used in picking citrus and other fruits, relates to that kind of sack which is suspended around the neck or body of the person engaged in picking the fruit and which is worn by the person either when picking the fruit from the position of standing on the ground or when mounted on a ladder, platform, or other analogous contrivance for enabling the picker to reach into the body or higher parts of the trees from which the fruit is to be picked.

My invention has for its object to enable the picker to pick a greater quantity of fruit in a given time by avoiding the necessity of repeatedly raising and lifting his hands to take the fruit from the branch from which it is clipped and then lower it to lay it in the sack or bag. By means of my invention the hands of the picker remain practically in the upraised position in the neighborhood of the fruit to be clipped from the trees, and in this way not only is the picking operation much simplified and generally made easier for the picker, but it enables him to pick a larger quantity of fruit in any given time.

By means of my invention the fruit clipped by one hand of the picker is directed by the other hand into a flexible tube of textile fabric, whose upper end is strapped to the wrist of one hand while the clippers are used by the other hand, and this flexible tube is connected to the upper part or mouth of the sack or bag into which the fruit is deposited. A short distance below the bottom end of this flexible tube a cushion is situated inside the bag, upon which each piece of fruit falls and is deposited gently as it descends down through the flexible tube, so that the blow of successive pieces of fruit falling upon each other in the sack, and which might bruise them, is broken in the descent of the fruit from the hand of the picker to the sack and injury by bruising is thereby avoided. So soon as the fruit reaches the aforesaid cushion it rolls or passes gently therefrom into the lower part of the sack. The lower part of the sack is drawn together by means of a cord passed through eyelet-holes, so that it can be closed up when the said cord is tightened through the said eyelet-holes, or when the said cord is loosened the bottom of the sack can be opened out to its full width. This arrangement when the sack is full of fruit allows the fruit contained in it to be discharged from the lower end or bottom thereof into boxes, barrels, sweat-boxes, or other receptacles used for receiving the fruit.

On the annexed sheet of drawings, Figure 1 is a general perspective view of my improved sack or receptacle, showing the relative position of the several parts when in use. Fig. 2 is a perspective view of the lower part of the sack, showing the bottom thereof opened and some of the fruit in the act of being discharged therefrom. Fig. 3 is a perspective view of a man in the act of using my improved fruit-picking sack, showing the relative positions of its several parts to himself.

My improved sack is marked A upon the accompanying drawings and its upper end is open, as shown, being provided with a rim of cane, willow, or other light stiff material to maintain it in the open position. To one side of the upper part or mouth of the sack the flexible tooth B is attached, as shown, and its upper end is provided with a stiff ring or frame C of cane, willow or other suitable light and stiff material to maintain it open. This upper end of the flexible tube C is also provided with the straps and buckles D, by which it is attached to the wrist of the user, as shown more particularly in Fig. 3. The upper part or mouth of the sack A also has attached to it the strap E, which is passed over the neck or shoulders of the user and by which the entire contrivance is suspended upon him, as is seen more particularly at Fig. 3. Within the upper part of the sack A the cushion F is located, as seen at Fig. 1.

The lower mouth of the sack is formed with holes and preferably provided with eyelets through which the cord G passes, as is seen in all the figures. A guide-ring H is attached to the outside of the sack A, as shown at Figs. 1 and 2, through which the cord G passes upward and is provided with a retaining piece or handle I at its upper end, which enables the cords G to be firmly fastened to the upper end or mouth of the sack A. When this handle I is so fastened to the hook at the upper part of the sack A, the position of the cord G is such as to draw the bottom of the sack together, as shown at Fig. 1, thereby rendering it capable of holding the fruit dropped thereinto from the hands of the operator through the flexible tube B, and when the sack A is full of picked fruit the handle I is released from the hook at the upper part or mouth of the sack A, when the weight of the fruit within the sack causes the lower mouth thereof to open, as shown at Fig. 2, and to discharge the picked fruit, as also shown in the same figure.

Having now described the nature of my invention, what I consider to be novel and original, and therefore desire to be secured to me by Letters Patent, is as follows:

The improved apparatus to be used in picking citrus and other fruit consisting of the combination of the sack, the flexible tube whose lower end is attached to near the mouth of the sack, and whose upper end is provided with straps for attaching the upper end of the tube to the wrist of the operator, thereby leaving the hand and the wrist to which the tube is thus attached, unimpeded, the cushion within the upper part of the sack and immediately below the bottom opening of the flexible tube, the suspending-strap for attaching the apparatus to the body of the user, the eyelets in the lower part of the sack, the cord passing through the eyelets, the fastening or handle for operating said cord and the hook for retaining the same when the bottom of the sack is closed, all operating together in the manner and for the purposes substantially as set forth.

In testimony whereof I have hereunto set my signature in presence of two subscribing witnesses.

WALTER ASPDEN.

Witnesses:
FRANCIS J. THOMAS,
H. B. LEWIS.